United States Patent [19]
Holtkamp

[11] Patent Number: 5,704,613
[45] Date of Patent: Jan. 6, 1998

[54] METHODS FOR SEALING AND UNSEALING USING A MAGNETICALLY PERMEABLE SOLID-BASED MEDIUM

[76] Inventor: William H. Holtkamp, 1363 Spencer Ave., San Jose, Calif. 95125

[21] Appl. No.: 729,706

[22] Filed: Oct. 7, 1996

Related U.S. Application Data

[60] Continuation of Ser. No. 459,973, Jun. 2, 1995, abandoned, which is a division of Ser. No. 311,081, Sep. 23, 1994.

[51] Int. Cl.$^6$ ........................................ F16J 15/00
[52] U.S. Cl. .............................. 277/1; 277/80; 384/446
[58] Field of Search ........................... 277/80, DIG. 6, 277/173, 1; 384/8, 446

[56] References Cited

U.S. PATENT DOCUMENTS

| | | | |
|---|---|---|---|
| 3,612,630 | 10/1971 | Rosensweig | 308/10 |
| 3,620,584 | 11/1971 | Rosenweig | 308/187.1 |
| 3,648,269 | 3/1972 | Rosenweig et al. | 340/373 |

(List continued on next page.)

FOREIGN PATENT DOCUMENTS

| | | | |
|---|---|---|---|
| 49169 | 3/1985 | Japan | 277/80 |
| 1525389 | 11/1989 | U.S.S.R. | 277/80 |
| 1749593 | 7/1992 | U.S.S.R. | 277/80 |

OTHER PUBLICATIONS

Bush, S., Letter, MER Corporation, Materials and Electrochemical Research Corporation (Feb. 1994).

Ferrofluidics Corporation, "Ferrofluidic Sealing Capabilities," Catalog.

Rigaku, "Rigaku/Magnetic Rotary Seal Unit–Rotary Feedthrough–RMS Series," Product Brochure.

Rigaku/USA, Inc., "FD–Series Rotary Feedthroughs," Product Brochure.

Sugiyama, H. et al., "Selection and Application Criteria for Magnetic–Liquid–Sealed Vacuum Rotary Feedthroughs," *Microelectronic Manufacturing and Testing* 1 (Oct. 1989).

Manbeck, K., "Product Overview and Description," Letter, Texas Fullerenes Corporation (Aug. 1994).

Mathieu, L. and Gruffat, J., "Corrosion Protection for Turbomolecular Pumps," *European Semiconductor* 45 (Mar. 1994).

MER Corporation, Materials & Electrochemical Research Corporation, "Buckytubes," Product Brochure/Price List (Feb./Mar. 1994).

Moffat, A., "Chemists Cluster in Chicago to Confer On Cagey Compounds," 258 *Science* 400 (1992).

Murry, R. and Scuseria, G., "Theoretical Evidence for a $C_{60}$ Window Mechanism," 263 *Science* 791 (Feb. 1994).

Paul, B., "Magnetic Fluid Seal Stops Fan VOC Emissions: Amoco Chemical Meets Clean Air Act Amendment for Fugitive Emissions," *Chemical Processing* (Nov. 1993).

Pennisi, E., "Buckyballs Still Charm: Scientists Ponder the Surprising Properties of $C_{60}$ and its Siblings," 140 *Science News* 120 (Aug. 1991).

(List continued on next page.)

*Primary Examiner*—Daniel G. DePumpo
*Attorney, Agent, or Firm*—Skjerven, Morrill, MacPherson, Franklin & Friel LLP.; Alan H. MacPherson; Emily M. Haliday

[57] ABSTRACT

Devices and methods employ a solid-based medium that serves as a magnetic sealant, a lubricant, a bearing, an electrical or thermal conductor, singly or in combination. Included are devices wherein the solid-based medium is retained in a selected position using a magnetic field. In particular, the solid-based medium is either magnetically coupled to the magnetic field or is contained within a cavity sealed by a magnetic seal. In one group of embodiments, the solid-based medium comprises molecules having a molecular structure wherein one element of the structure is a cage or tube, as in fullerenes or met-cars. Such molecules are particularly useful in all of the devices of the present invention because of their exceptional stability and resilience. These properties ensure good performance in corrosive and/or vacuum environments and over a longer lifetime than is possible with conventional media.

22 Claims, 7 Drawing Sheets

U.S. PATENT DOCUMENTS

| | | | |
|---|---|---|---|
| 3,977,739 | 8/1976 | Moskowitz et al. | 308/187 |
| 4,123,675 | 10/1978 | Moskowitz et al. | 310/49 R |
| 4,200,296 | 4/1980 | Stahl et al. | 277/80 |
| 4,252,353 | 2/1981 | Raj et al. | 277/80 |
| 4,284,605 | 8/1981 | Pierrat | 422/249 |
| 4,301,120 | 11/1981 | Sibley | 422/249 |
| 4,309,040 | 1/1982 | Pierrat | 277/80 |
| 4,315,827 | 2/1982 | Bottenberg et al. | 252/62.51 |
| 4,350,557 | 9/1982 | Scholl et al. | 156/601 |
| 4,350,560 | 9/1982 | Helgeland et al. | 156/617 SP |
| 4,356,098 | 10/1982 | Chagnon | 252/62.51 |
| 4,357,021 | 11/1982 | Raj et al. | 277/1 |
| 4,357,022 | 11/1982 | Raj | 277/1 |
| 4,357,023 | 11/1982 | Yamamura | 277/1 |
| 4,357,024 | 11/1982 | Raj | 277/1 |
| 4,371,502 | 2/1983 | Sibley et al. | 422/249 |
| 4,386,784 | 6/1983 | Banks | 277/80 |
| 4,406,731 | 9/1983 | Chartier | 156/617 SP |
| 4,407,508 | 10/1983 | Raj et al. | 277/1 |
| 4,407,518 | 10/1983 | Moskowitz et al. | 277/1 |
| 4,430,239 | 2/1984 | Wyman | 252/62.51 |
| 4,444,398 | 4/1984 | Black, Jr. et al. | 277/1 |
| 4,445,696 | 5/1984 | Raj et al. | 277/80 |
| 4,478,424 | 10/1984 | Raj | 277/80 |
| 4,489,950 | 12/1984 | Chorney | 277/80 |
| 4,502,700 | 3/1985 | Gowda et al. | 277/80 |
| 4,506,895 | 3/1985 | Raj | 277/1 |
| 4,526,379 | 7/1985 | Raj | 277/80 |
| 4,526,380 | 7/1985 | Raj et al. | 277/80 |
| 4,526,382 | 7/1985 | Raj et al. | 277/80 |
| 4,526,484 | 7/1985 | Stahl et al. | 384/133 |
| 4,527,805 | 7/1985 | Gowda et al. | 277/80 |
| 4,531,846 | 7/1985 | Raj | 384/478 |
| 4,545,587 | 10/1985 | Higgins | 277/80 |
| 4,575,102 | 3/1986 | Raj et al. | 277/80 |
| 4,605,233 | 8/1986 | Sato | 277/80 |
| 4,628,384 | 12/1986 | Raj et al. | 360/97 |
| 4,630,943 | 12/1986 | Stahl et al. | 384/133 |
| 4,663,128 | 5/1987 | Helgeland | 422/249 |
| 4,687,596 | 8/1987 | Borduz et al. | 252/510 |
| 4,692,826 | 9/1987 | Raj et al. | 360/97 |
| 4,694,213 | 9/1987 | Gowda et al. | 310/90 |
| 4,732,706 | 3/1988 | Borduz et al. | 252/510 |
| 4,772,032 | 9/1988 | Moskowitz | 277/80 |
| 4,817,964 | 4/1989 | Black, Jr. | 277/1 |
| 4,824,122 | 4/1989 | Raj et al. | 277/80 |
| 4,830,384 | 5/1989 | Raj et al. | 277/80 |
| 4,847,526 | 7/1989 | Takehara et al. | 310/185 |
| 4,865,334 | 9/1989 | Raj et al. | 277/80 |
| 4,890,850 | 1/1990 | Raj et al. | 277/80 |
| 4,898,480 | 2/1990 | Raj et al. | 384/446 |
| 4,927,164 | 5/1990 | Raj et al. | 277/80 |
| 4,955,731 | 9/1990 | Yamamura | 384/133 |
| 5,018,751 | 5/1991 | Raj et al. | 277/80 |
| 5,046,151 | 9/1991 | Yamamura | 310/90.5 |
| 5,050,891 | 9/1991 | Ishikawa | 277/80 |
| 5,052,697 | 10/1991 | Ishikawa | 277/80 |
| 5,066,879 | 11/1991 | Yamamura | 310/90.5 |
| 5,068,558 | 11/1991 | Yamamura | 310/90.5 |
| 5,073,737 | 12/1991 | Yamamura | 310/90.5 |
| 5,092,740 | 3/1992 | Yamamura | 417/201 |
| 5,242,667 | 9/1993 | Koziol et al. | 422/249 |
| 5,275,537 | 1/1994 | Gasser | 417/48 |
| 5,358,659 | 10/1994 | Ziolo | . |
| 5,456,986 | 10/1995 | Majetich et al. | 428/403 |
| 5,474,302 | 12/1995 | Black, Jr. et al. | 277/1 |

OTHER PUBLICATIONS

Peterson, L. "Profile Emerges of Well–Rounded Molecule," *Science News* 197 (Mar. 1991).

Ruoff, R., "Fullerenes," 3 *Interface* 29 (1994).

Schmidt, K., "Synthesis in Soot: The New Molecular Cages," 143 *Science News* 229 (Apr. 1993).

Strauss, M., "Better Living Through Buckyballs," *Discover* 74 (Jan. 1992).

Temerin, M., "Frequently Asked Questions," Letter, Term USA 1 (Jul. 1994).

Teresko, J., "Buckminsterfullerenes," 240 *Industry Week* 38 (Nov. 1991).

VRC, Vacuum Research Corporation, "Absolutely Oil–Free Vacuum Pumps," Promotional Brochure (1992).

Aldersey–Williams, H., "The Third Coming of Carbon," *Technology Review* 54 (Jan. 1994).

Amato, L., "Doing Chemistry in the Round," 254 *Science* 30 (1991).

Bez, E. and Guarnaccia, D., "Dry Vacuum Pump Application Report," VRC, Vacuum Research Corporation, Corporate Brochure (Mar. 1991).

Crabb, C., "More Fun With Buckyballs," *Discover* (Jan. 1993).

Curl, R. and Smalley, R., "Fullerenes," *Scientific American* 54 (Oct. 1991).

Dexter—Permag, "Material Characterics," *Permanent Magnet Catalog* (1994).

Edelson, E., "Buckyball The Magic Molecule," *Popular Science* 52 (Aug. 1991).

Ferrofluidics Corporation, "Audio And Other Fluid Products," and Emissions Control Sealing Systems And Other Emerging Products, Corporate Brochures.

Ferrofluidics Corporation, "Hermetic Sealing With Magnetic Fluids: A Means of Meeting Environmental Regulations," *Industrial Engineering News* (Nov./Dec. 1992).

Ferrofluidics Corporation, "Novel Seal Snares Pump Emissions," 3 *Environment Today* (1992).

Ferrofluidics Corporation, "Performing Seals," *The Economist* 81 (Jul. 1993).

Ferrofluidics Corporation, "Vaaler Awards/Technology for Tomorrow," *Chemical Processing* 16 (November 1992).

METHODS FOR SEALING AND UNSEALING USING A MAGNETICALLY PERMEABLE SOLID-BASED MEDIUM

This application is a continuation of application Ser. No. 08/459,973, filed Jun. 2, 1995 now abandoned; which is a division of application Ser. No. 08/311,081, filed Sep. 23, 1994.

FIELD OF THE INVENTION

This invention relates to devices and methods employing a solid-based medium. In particular, the invention includes devices wherein the solid-based medium is maintained in a selected position within each device by a magnetic field. The solid-based medium serves as a sealant, a lubricant, a bearing, an electrical conductor or insulator, a thermal conductor, or a combination thereof.

BACKGROUND OF THE INVENTION

In a wide variety of applications, an opening between two different environments must be sealed, for example, to maintain a pressure differential or to prevent materials from one environment from entering the other (hereinafter "an exclusion seal"). Such seals can be dynamic, allowing movement of the sealed parts, or static. An example of the former is found in rotary feedthroughs, which consist of a rotating shaft surrounded by a housing. These devices are used to transfer rotary motion from an environment at a selected pressure (such as atmospheric pressure) to a vacuum, to or from a hazardous environment, or to or from a "clean" environment (such as is required for semiconductor or disk drive production). Seals allowing limited axial motion of a shaft in a housing have also been described.

Solid sealants are well known and include rubber, VITON, TEFLON, or polytetrafluoroethylene composite polymer. Although such solid sealants can be effective for static applications, these materials are unsuitable for many dynamic applications. Prior art solid O-rings used to seal a rotating shaft, for example, wear relatively rapidly and shed particles that contaminate the environments on either side of the seal. Other prior art sealants include gases, oils, greases, and "ferrofluids."

Ferrofluids are magnetic liquids that are used as sealants in magnetic liquid-sealed rotary feedthroughs. Such feedthroughs typically consist of a shaft held in a housing by a pair of bearings on each end of the housing. In between the bearings, the housing also holds an arrangement of an annular magnet sandwiched between two annular pole piece elements, which surrounds the shaft. The pole piece elements are each designed to form a very small gap with the rotating shaft and to concentrate the magnetic field in this region. The magnetic field retains ferrofluid in the gap, forming a liquid "O-ring."

A wide variety of modifications of this basic configuration have been patented, among them designs aimed at providing stronger seals, increasing seal life and convenience of use, and decreasing seal size and cost. U.S. Pat. No. 4,445,696 (issued to Raj et al., May 1, 1984) discloses a device designed to provide a nonbursting seal for high vacuum applications. U.S. Pat. No. 4,506,895 (issued to Raj, Mar. 26, 1985) teaches a magnetic seal that self-activates when a feedthrough is assembled. A composite ferrofluid bearing and seal apparatus incorporating a fluid storage cavity is described in U.S. Pat. No. 4,630,943 (issued to Stahl et al., Dec. 23, 1986). A plurality of magnets disposed in series (a multi-stage sealing device) to increase the pressure differential capability of the seals is disclosed in U.S. Pat. No. 4,605,233 (issued to Sato on Aug. 12, 1986).

The ferrofluid in such devices generally consists of a suspension of small ferromagnetic particles (on the order of 100 Å in diameter) in a liquid base. The particles are typically coated with a surfactant to reduce clumping caused by magnetic attraction.

A wide variety of ferrofluid compositions have been developed, however, all contain significant amounts of liquid, which has a number of drawbacks. First, liquid compositions are subject to "outgassing," in which one or more components volatilizes and contaminates one or both of the sealed environments. Second, the components of prior art ferrofluids tend to separate out, reducing seal effectiveness, especially in very strong magnetic fields. Third, seal effectiveness is also compromised by the clumping of the magnetic particles in the ferrofluid, which can result in an uneven particle distribution over the sealing area. Because of these problems, the pressure differential capacity of prior art ferrofluid seals has been limited to 5 psi/stage. Multi-stage ferrofluid seals have been employed to provide vacuum chamber pressures as low as $5 \times 10^{-9}$ Torr; however, lower pressures are difficult to maintain due to outgassing from the ferrofluid seal material.

A final disadvantage the prior art ferrofluids is the "wetting tendency" of the liquid in these compositions. This tendency of liquids to stick to surfaces results in fluid loss from the seal, which, in turn, reduces seal life and causes contamination problems. Such problems are particularly severe in applications where the seal encloses a shaft that moves axially. Magnetic liquid-sealed axial feedthroughs are disclosed in U.S. Pat. No. 4,309,040 (issued to Peirrat, Jan. 5, 1982) and U.S. Pat. No. 4,502,700 (issued to Gowda et al., Mar. 5, 1985). The former teaches the use of a pressure ring and scraper ring to prevent escape of the ferrofluid, whereas the latter describes the use an annular collector magnet and a rod wiper to contain the ferrofluid. While these designs reduce fluid loss due to wetting, neither design eliminates the problem, which limits the utility of such seals.

Attempts to circumvent this problem have employed a bellows assembly or magnetic coupling and/or levitation strategies. However, these approaches are costly, and devices employing magnetic coupling tend to be bulky. A magnetic liquid-sealed axial feedthrough is less expensive and more compact, and thus would be preferred if the problems associated with liquid sealants could be avoided.

SUMMARY OF THE INVENTION

The present invention relates to devices and methods employing a medium containing molecules and/or atoms in the solid phase (hereinafter "a solid-based medium"). In particular, the invention includes devices and methods wherein a magnetic field is used to maintain a solid-based medium in a selected position within a device.

In one group of embodiments, the solid-based medium serves as a magnetic sealant in magnetic sealing devices. The resulting seal need not contain any liquid (referred to hereinafter as a "solid-based magnetic seal"). In addition, the present invention includes methods for using the solid-based medium to form a solid-based magnetic seal.

The solid-based magnetic seal has a wider utility and longer life than prior art ferrofluid seals because the use of a solid-based seal reduces or eliminates the problems associated with the use of liquids in magnetic sealants. In particular, the use of a solid-based seal reduces outgassing and separation of fluid components. Because separation of fluid components is particularly likely to occur when strong magnetic fields are employed, the solid-based seals of the present invention allow the use of stronger magnetic fields than previously possible. In addition, problems associated with liquid wetting are less likely when a solid-based seal is used, and solid-based seals are therefore more suitable for use in axial feedthroughs than prior art ferrofluid seals. Moreover, in accordance with this invention, a solid-based magnetic seal can be designed to reduce the problems of wear and contamination associated with the use of prior art solid seals in dynamic applications.

The solid-based medium used in the solid-based seal includes magnetically permeable molecules. As used herein, the term "magnetically permeable" refers to any material that can have a force applied to it by magnetic flux such that the material can be retained by the magnetic fields in the devices and methods of the present invention. Magnetically permeable materials include ferromagnetic and paramagnetic materials. The term "ferromagnetic" refers to the property of materials containing metals such as iron, cobalt, and nickel that results from the coupling of the magnetic moments of adjacent atoms and the grouping of these atoms into domains with a strong net magnetic moment. The term "paramagnetic" refers to materials whose atoms or molecules have permanent magnetic moments that can be oriented parallel to each other by the application of a magnetic field.

The term "magnetically nonpermeable" is used herein with reference to molecules or particles to indicate a material incapable of being retained by the magnetic fields in the devices and methods of the present invention. In addition, the term "magnetically nonpermeable" is used herein in reference to a member of a device to indicate a material not responsive to magnetic flux such that the magnetic field in the gap is insufficient to retain magnetically permeable molecules or particles.

In one embodiment, the magnetically permeable molecules of the present invention have a molecular structure wherein one element of the structure is a cage or tube, such as is found, for example in fullerenes. This molecular structure is referred to hereinafter as "a cage-based or tube-based structure," and molecules comprising such a structure are denoted "cage/tube-based molecules."

Fullerenes are a family of extremely stable, resilient molecules, some of which have been shown to exhibit magnetic properties. These molecules can be modified to enhance such properties, for instance, by inserting an iron atom into the fullerene cage. In addition, the molecules of one fullerene, the spherical $C_{60}$, are known to spin without touching neighboring molecules. Because of this property, such molecules are uniquely suited for sealing magnetic sealing devices that must accommodate movement.

The present invention also provides novel magnetic sealing devices for use with the solid-based seals of the present invention as well as with prior art ferrofluid seals. In one embodiment, the magnetic sealing device is capable of sealing and unsealing an opening. The present invention also includes a method for sealing and unsealing a magnetic sealing device.

In addition, the present invention provides devices wherein the solid-based medium serves as a lubricant, a bearing, an electrical conductor or insulator, and/or a thermal conductor. The solid-based medium is conveniently maintained in a selected position within a device by use of a magnetic field.

DETAILED DESCRIPTION OF THE INVENTION

Solid-Based Medium

Figure 1:
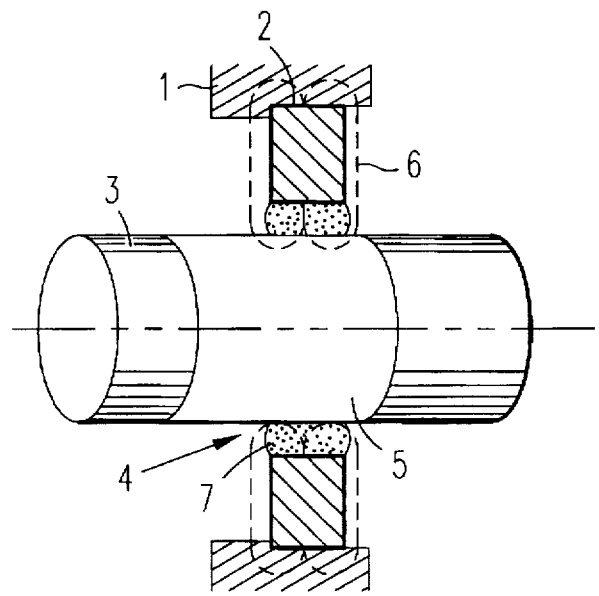
FIG. 1 is a partial cross-sectional view of a single-stage, solid-based magnetic sealing device, wherein a housing holds an annular, radially polarized magnet.

The present invention provides devices and methods employing a solid-based medium. The solid-based medium is conveniently maintained in a selected position within a device by the use of a magnetic field. Specifically, the solid-based medium can be a magnetically permeable medium positioned within, and retained by, the magnetic field. Alternatively, the solid-based medium can be contained in a cavity or container within a device. Any openings in the cavity or container can be sealed with a magnetic seal.

In one embodiment, the solid-based medium includes molecules having a cage-based or tube-based structure. Suitable cage/tube-based molecules include fullerenes, metallo-carbohydrenes, and derivatives thereof. The term "fullerene" is used herein to refer to the family of pure carbon molecules characterized by a cage-based or tube-based structure. Fullerenes are also known in the art as "buckyballs" and "buckytubes," respectively, and reports indicate that both types of molecules are exceptionally stable and resilient. The most common fullerene isomers are $C_{32}$, $C_{44}$, $C_{50}$, $C_{58}$, $C_{60}$, and $C_{10}$. Of these, $C_{60}$ and $C_{70}$ are the most readily produced. $C_{60}$ is a spherical buckyball, whereas $C_{70}$ is ellipsoidal. Buckytubes have a molecular structure wherein one element of the structure is a cylindrical tube, which can be open or closed on the ends. Both buckyballs and buckytubes can exist as concentric, multi-layered structures.

Fullerenes are produced by heating carbon or hydrocarbon precursors in an inert gas, such as helium, to extremely high temperatures, typically in the vicinity of 1700° to 2700° C. This heating process can be carried out according to a variety of procedures, including resistive heating of graphite rods, carbon arc, and flame synthesis with hydrocarbon fuels such as benzene. The material produced by these procedures is termed "fullerene soot" and comprises a mixture of fullerene isomers. This mixture can be used in the present invention without further purification or, alternatively, sub-mixtures or individual isomers can be purified by conventional methods and used. Fullerene soot and individual isomers are commercially available from Magnetic Electrochemical Research Corporation (MER Corp., Tucson, Ariz.).

The solid-based medium of the present invention can also comprise molecules such as metallo-carbohydrenes (hereinafter "met-cars"). Met-cars are another family of molecules having a cage-based or tube-based structure. These molecules exist as single and multiple cages and contain both metal and carbon atoms. Met-cars can be produced by vaporizing rods containing graphite and the desired metal in a helium atmosphere. As with fullerenes, the product is a sooty material that represents a mixture of met-cars and other components.

In a variation of this embodiment, the cage/tube-based molecules are free-spinning. As used herein, the term "free-spinning" indicates that each molecule is physically and rotationally independent of its neighbors at the temperatures typically encountered in the particular application. Exemplary free-spinning molecules of the present invention include $C_{60}$ and $C_{70}$. Studies show that the spherical $C_{60}$ molecules pack together as if they were perfectly smooth balls and spin without touching each other. $C_{60}$ molecules reportedly must be cooled to −196° C. before spinning stops. The ellipsoidal $C_{70}$ spins freely around its long axis. Such free-spinning molecules are particularly useful for reducing friction between moving parts.

In another embodiment, the solid-based medium of the present invention comprises particles. In a variation of this embodiment, the solid-based medium is a liquid-free composition.

The solid-based medium is useful in a wide variety of devices as a magnetic sealant, a lubricant, a bearing, an electrical conductor or insulator, a thermal conductor, and any combination thereof. Each of these applications is described below, along with the specialized requirements for the solid-based medium in each application, where applicable.

Devices and Method Employing the Solid-Based Medium as a Magnetic Sealant

Solid-Based Magnetic Sealing Device

In one group of embodiments, the present invention provides a magnetic sealing device wherein the magnetic sealant is the solid-based medium of the present invention. In this group of embodiments, the solid-based medium (hereinafter termed a "solid-based magnetic sealant") is magnetically permeable and is retained in position via magnetic coupling to a magnetic field.

The magnetic sealing device comprises a housing that holds both a magnet or magnet assembly and, in a closely spaced, noncontacting relationship to the magnet, a member that has a magnetically permeable region at a surface facing the magnet. Alternatively, the entire member can be magnetically permeable. The magnet and member define a gap adjacent to the magnetically permeable region of the member, and the solid-based magnetic sealant is retained in the gap. The magnetically permeable region of the member permits the passage of magnetic flux such that the magnetic field in the gap is sufficient to allow magnetic seal formation. The magnet and member can be connected to the housing by any conventional means. For example, the magnet can be attached to the housing, and the member can be positioned in the housing via bearings.

Alternatively, the locations of the magnet and the magnetically permeable regions can be reversed. In this reversed configuration, the housing and the member described above can be one and the same. The housing thus has a magnetically permeable region at a surface or is entirely magnetically permeable. The housing holds a second member, having a magnet (or magnet assembly) mounted thereon, such that the magnet faces the magnetically permeable region of the housing surface. The housing surface and magnet have a closely spaced, noncontacting relationship, and the solid-based magnetic sealant is retained in the gap between these two elements. Conventional means are used to connect the second member to the housing.

The magnet of this and the other magnetic sealing devices disclosed herein does not differ from those of the prior art. The magnet can be a permanent magnet or an electromagnet, with or without pole piece elements, and can be formed from a wide variety of materials, such as Plastiform, ceramic, or metal. Suitable magnet materials include neodymium iron boron, samarium cobalt, and ALNICO. The energy product of the magnet varies depending on the particular sealing device. For example, at a given magnetic field strength, a reduction in the size of the gap between the magnet and the member to be sealed allows the use of a magnet with a lower energy product. In addition, the energy product of the magnet can vary with the application. Magnets in exclusion seals, for example, generally need not have as high an energy product as magnets in seals that must maintain a pressure differential between two environments. The selection of an appropriate magnet for a particular application and device is within the level of skill in the art. Pole piece elements, if present, can have any conventional design.

Magnetic sealing devices having ferrofluid seals are well-known, and, as stated above, a wide variety of structures have been disclosed for these devices. The solid-based magnetic sealant of the present invention can be used to form a solid-based seal in any of these structures. In particular, the present invention encompasses devices that have dynamic seals as well as static seals. Solid-based dynamic seals preferably contain a component to reduce friction such as magnetically permeable molecules that spin freely and/or a lubricant.

For purposes of illustration, the solid-based magnetic seal of the present invention is described with reference to FIGS. 1–3. These figures, however, are not intended to limit the invention to the devices shown therein. Other configurations of magnet (or magnet assembly) and member are well-known, and modifications are readily apparent to those skilled in the art, in view of the present disclosure.

One magnetic sealing device of the present invention is shown in FIG. 1. The sealing device comprises housing 1 holding annular, radially polarized magnet 2. Magnet 2 is adapted to annularly surround rod-like member 3 and extends into a closely spaced, noncontacting relationship with the surface of member 3. The term "rod-like member" is used herein to indicate a rod, shaft, or cylinder of any design and includes, for example, a piston. Typically, member 3 is movable relative to magnet 2, either rotationally, axially, or both. A very small, radial gap 4 exists between magnet 2 and member 3. Member 3 is either fully magnetically permeable or has magnetically permeable region 5 at the surface of member 3 opposite magnet 2 such that lines of magnetic flux 6 travel from the north pole of magnet 2, which is proximal to member 3, through magnetically permeable region of member 3, to the south pole of magnet 2, which is distal to member 3. Solid-based magnetic sealant 7 is retained in gap 4 to form a one-stage magnetic seal.

Figure 2:
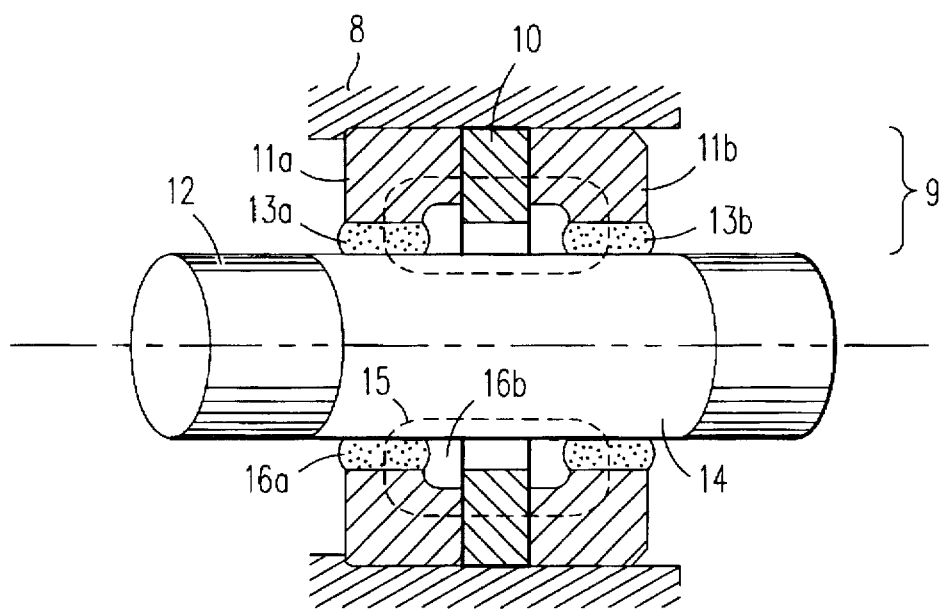
FIG. 2 is a partial cross-sectional view of a two-stage, solid-based magnetic sealing device, wherein a housing holds an annular, axially polarized magnet assembly including pole piece elements.

Another embodiment is shown in FIG. 2. Housing 8 holds magnet assembly 9, which includes annular, axially polarized magnet 10 sandwiched between two pole-piece elements 11a and 11b. Pole-piece elements 11a and 11b are in a contacting, magnetic-flux relationship with each end of magnet 10. Magnet assembly 9 is adapted to annularly surround rod-like member 12, which is typically movable (either rotationally, axially, or both). Pole piece elements 11a and 11b extend into a closely spaced, noncontacting relationship with the surface of member 12 to define radial gaps 13a and 13b. Member 12 is either fully magnetically permeable or has magnetically permeable region 14 at the surface of member 12 opposite magnet assembly 9 such that lines of magnetic flux 15 travel from north pole piece element 11a, through magnetically permeable region 14 of member 12, to south pole piece element 11b. Solid-based magnetic sealant 16a is retained in gaps 13a and 13b to form a two-stage magnetic seal.

Figure 3:
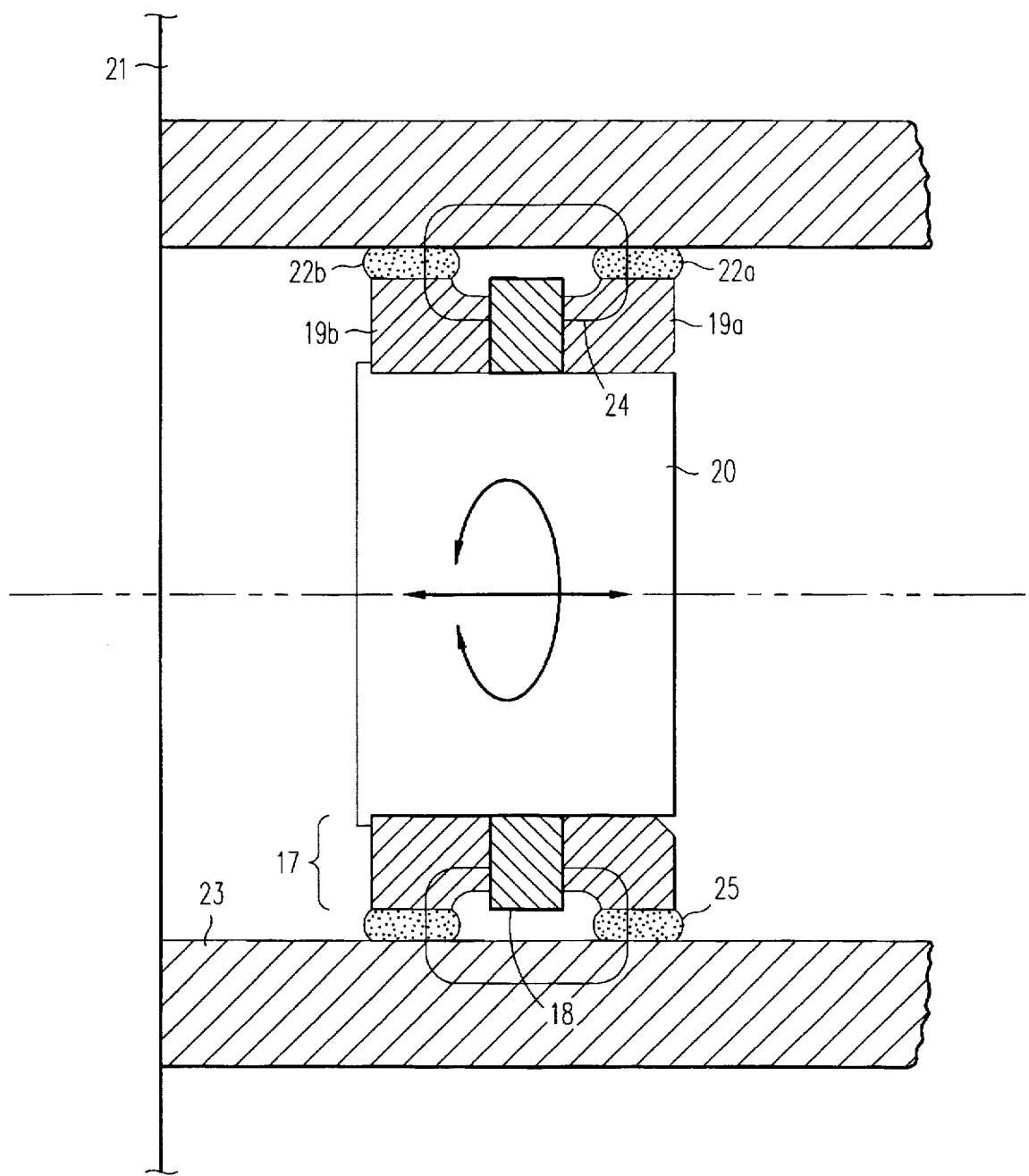
FIG. 3 is a cross-sectional view of a two-stage, solid-based magnetic sealing device, that is identical to the device of FIG. 2 except that the magnet assembly is mounted on a member instead of on the housing.

FIG. 3 shows a device that is similar to that of FIG. 2, except that in FIG. 3, the magnet is mounted on a rod-like member. Specifically, magnet assembly 17, consisting of annular, axially polarized magnet 18 and pole-piece elements 19a and 19b, is mounted on and annularly encircles rod-like member 20, which is typically movable (either rotationally, axially, or both). Pole piece elements 19a and 19b extend into a closely spaced, noncontacting relationship with the surface of housing 21 to define radial gaps 22a and 22b. Housing 21 has an annular, magnetically permeable region 23 at the surface of housing 21 opposite magnet assembly 17 such that lines of magnetic flux 24 travel from north pole piece element 19a, through magnetically permeable region 23 of housing 21, to south pole piece element 19b. Solid-based magnetic sealant 25 is retained in gaps-22a and 22b to form a two-stage magnetic seal.

The solid-based magnetic sealant of the present invention is a solid-based medium wherein at least one component of the medium is magnetically permeable. When the solid-based medium comprises magnetically permeable and nonpermeable components, the latter is retained in the magnetic field, along with the magnetically permeable component, by any conventional method. In particular, the magnetically nonpermeable component can be selected so that individual molecules or particles are too large to move through the array of the magnetically permeable component in the magnetic field. Alternatively, electron stripping occurs with strong magnets, producing ions. The magnetically nonpermeable component then associates, via ionic interactions, with the magnetically permeable component, which is retained by the magnetic field. In this manner, the magnetically permeable component holds the magnetically nonpermeable component in position.

In one embodiment, the solid-based magnetic sealant comprises molecules having a cage-based or tube-based structure, including, as stated above, fullerenes, met-cars, and derivatives thereof. These molecules are inherently magnetically permeable or have been modified to provide this property. Such modification involves placing a magnetically permeable material in a molecule with another material such as carbon or silicon, for example.

Exemplary met-cars that are inherently magnetically permeable include those containing iron. In addition, several reports indicate that unmodified fullerenes, such as $C_{60}$, possess magnetic properties. However, it is generally desirable to enhance any inherent magnetic properties by inserting a chemical entity into the fullerene cage or by binding a chemical entity to one or more of the cage carbon atoms. Such structures may encompass a chemical entity bound to the outside of the cage and an atom substituted for a cage carbon as well as other structures.

In particular, fullerenes can be modified to form metallo-fullerene complexes of metals, such as iron, cobalt, and/or nickel. Such complexes can have one or more metal atoms contained inside and/or bound to the fullerene cage. In one embodiment, the present invention uses an iron-fullerene complex to provide or increase fullerene particle magnetization. This complex is produced by heating an iron and graphite rod in the process described above. $C_{60}$ iron-fullerene complexes are commercially available from MER Corp. (Tucson, Ariz.) as iron-based fullerene soot. Also available are $C_{60}$ metallo-fullerene complexes of copper, lead, cobalt, nickel, and rhodium. In addition, MER Corp. sells a variety of buckytubes (single- and multi-layered) doped with potassium, magnesium, scandium, titanium, vanadium, manganese, iron, nickel, cobalt, silver, aluminum, and silicon.

The magnetically permeable, cage/tube-based molecules of the present invention have a magnetization value that can vary depending on the magnetic flux density in the gap to be sealed and the desired seal strength. Particles in prior art ferrofluid sealants have magnetizations ranging from 100 to 1000 gauss, depending on seal configuration and application. Typically, magnetizations of greater than 600 gauss are preferred for high vacuum applications, whereas magnetizations of 100 to 400 gauss are used for low vacuum applications or exclusion seals, where there is no pressure differential across the seal. In general, molecules having magnetization values in the range of about 100 to about 1000 gauss are suitable for use in the magnetic seals of the present invention. One skilled in the art can readily determine the narrower range of magnetization values appropriate for a particular application.

The magnetically permeable, cage/tube-based molecules must be smaller in diameter than the gap between the magnet (or magnet assembly) and the member making up the sealing device (generally 2 to 10 mm in prior art devices). Although a wide range of molecular sizes is possible, the use of smaller sized molecules allows the size of the gap to be reduced, thereby increasing the strength of the seal.

In one embodiment, the magnetically permeable, cage/tube-based molecules comprise the fullerene $C_{60}$ and/or derivatives thereof. $C_{60}$ has a molecular diameter of approximately 7 Å (with a nearest neighbor distance of 10 Å) and therefore can be employed in magnetic sealing devices having a very small gap between the magnet and the member.

The magnetically permeable, cage/tube-based molecules should be physically stable and should exist as a solid under the conditions encountered in the magnetic seal. Such conditions vary with seal configuration and application and are known to those skilled in the art. Generally, seal temperatures are held below 100° C., by water cooling, if necessary. Thus, molecules that are solids and retain their physical structure at temperatures less than about 100° C. are suitable for use in the present invention. However, molecules suitable for use in the present invention also exist as stable solids at higher temperatures. Such molecules can be used in seals that are exposed to temperatures of about 100° C. or greater. For example, $C_{60}$ can be employed at temperatures of up to about 300° C. in air or 150° C. in an oxygen-rich environment.

For high vacuum applications, the magnetically permeable, cage/tube-based molecules should be selected for stability at the seal pressures encountered in the particular sealing device to reduce outgassing. Prior art ferrofluid seals are typically able to withstand seal pressures of up to about 3-4 psi per stage. In a high vacuum application, therefore, the magnetically permeable, cage/tube-based molecules of the present invention are preferably able to withstand seal pressures about 3 psi or greater. Experiments with a mixture of iron-fullerene complexes indicate that this mixture can withstand pressures of at least 6 psi when this mixture is used as a seal. However, the molecules of the present invention can also be used as a barrier between two environments (e.g., an exclusion seal), and in such applications, it may not be necessary for the molecules to withstand any significant pressure differential.

In addition, the magnetically permeable, cage/tube-based molecules should be selected for chemical stability under the conditions encountered in the particular application. For example, if the seal is to be used in conjunction with a corrosive environment, the molecules must be resistant to chemical modification by the corrosive agents encountered.

In one embodiment, the magnetically permeable, cage/tube-based molecules of the present invention are free-spinning. Such free-spinning molecules are particularly useful for reducing friction in seals involving moving parts, such as the seals in rotary or axial feedthroughs, pumps, or valves. In another embodiment, the molecules comprise $C_{60}$ metallo-fullerene complexes wherein the metal is selected from the group consisting of iron, cobalt, and nickel. In a variation of this embodiment, the $C_{60}$ metallo-fullerene complex comprises at least one iron atom contained within the $C_{60}$ cage.

The magnetically permeable, cage/tube-based molecules can be used as a magnetic sealant alone or in combination with one and other or with other substances. For example, the molecules can be mixed with magnetically nonpermeable molecules. In addition, magnetically permeable, cage/tube-based molecules that are free-spinning can be mixed with substances having molecules or atoms that do not spin freely. Magnetically permeable molecules having a cage-based or tube-based structure can also be combined with a solid composition comprising particles such as, for example, spherical stainless steel powder, to form a sealant.

Furthermore, magnetically permeable, cage/tube-based molecules can be combined with one or more liquids. For instance, such molecules can be substituted for, or used in combination with, magnetic particles in prior art ferrofluids. The inclusion of liquids in the solid-based magnetic sealant, however, can lead to the problems of outgassing, separation of sealant components, and fluid wetting discussed above.

To avoid these problems, one embodiment of the present invention provides a magnetic sealing device wherein the magnetic seal is liquid-free. In this embodiment, the solid-based magnetic sealant is liquid-free and consists of magnetically permeable, cage/tube-based molecules and/or a solid composition comprising particles that are magnetically permeable. As discussed above for cage/tube-based molecules, the magnetically permeable particles have a degree of magnetization that is suitable for the particular application. In addition, the magnetically permeable particles are of a suitable size to align in response to magnetic flux. Furthermore, the solid composition should retain its particulate solid character at the temperatures encountered in the application, which are typically less than about 100° C. for most magnetic sealing devices. The solid composition should also be selected for chemical stability under the conditions encountered in the particular application.

Suitable compositions comprise magnetically permeable particles derived from iron, cobalt, nickel, iron-silicon, PERMALLOY, MUMETAL, PERMENDUR, manganese ferrite, nickel ferrite, cobalt steel, neodymium iron boron, samarium cobalt, ALNICO, and combinations of such particles. A particulate lubricating solid can be included in the solid composition to produce a composition that is useful in dynamic seals, such as seals in rotary or axial feedthroughs. Suitable lubricating solids include graphite and graphite derivatives, such as graphite-fluoride; metals, including bronze, indium, lead, silver, tin, and zinc; as well as compounds such as molybdenum disulfide, niobium selenide, and tungsten disulfide. Steel or iron particles can be used if treated by the NI-SURF gas nitriding process (Alloy Hard Surfacing, Inc., San Jose, Calif.). Suitable lubricating particles can also be derived from plastics, including acrylonitrile butadiene styrene (ABS); acetals; nylons, such as type 6 and 6/6 nylon; polyesters, such as polybutylene terephthalate; TEFLON; and plastic "alloys," such as ABS/polyurethane. Alternatively, free-spinning, cage/tube-based molecules can be included in the solid composition to provide or increase lubrication. In static seals, no lubricant is necessary.

Method for Forming a Solid-Based Magnetic Seal

The present invention provides a method for forming a solid-based magnetic seal by exposing a solid-based magnetic sealant to a magnetic field. The magnetic field is located in a gap between two surfaces to be sealed. This magnetic field retains the solid-based magnetic sealant in the gap, thus producing a seal.

The solid-based magnetic sealant can be exposed to a magnetic field by any conventional method. For instance, a magnetic field can be provided in the gap, and the solid-based magnetic sealant can be applied to the gap in the region of the magnetic field. In this embodiment, the solid-based magnetic sealant is typically injected, or otherwise inserted, into the gap of a preassembled magnetic sealing device. Alternatively, the solid-based magnetic sealant can be retained in contact with the magnet or pole piece elements, and subsequent assembly of the magnetic sealing device causes the solid-based magnetic sealant to move into position in the gap.

Magnetic Sealing Devices Employing Solid- or Liquid-Based Magnetic Seals

The present invention includes several novel magnetic sealing devices wherein the magnetic sealant can either be the solid-based magnetic sealant described herein or any of the prior art ferrofluids. These magnetic sealing devices include dynamic as well as static seals. When dynamic seals are used, however, the magnetic sealant should be designed to reduce friction. Liquid-free seals should therefore contain free-spinning molecules and/or a solid lubricant. Regardless of seal type, cage/tube-based molecules are suitable for use as a sealant, alone or in combination with other components, in all of these devices.

Figure 4:
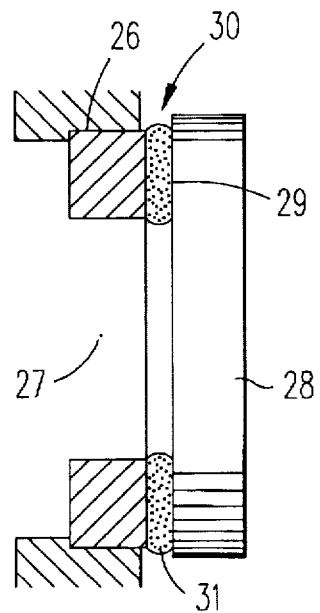
FIG. 4 is a cross-sectional view of a one-stage, magnetic sealing device, wherein a housing holds an annular, axially polarized magnet that surrounds an opening to be sealed.

One magnetic sealing device of the present invention is shown in FIG. 4. This device includes annular, axially polarized magnet 26, which is adapted to surround opening 27, and member 28, which is adapted to cover both opening 27 and magnet 26. Member 28 is either fully magnetically permeable or has magnetically permeable region 29 at a surface of member 28. (If desired, member 28 can be entirely magnetically permeable.) Region 29 faces magnet 26 in a closely spaced, noncontacting relationship, defining gap 30. Magnetic sealant 31 is retained in gap 30 by magnetic flux as discussed above. This device can be used, for example, to replace or augment O-rings or metallic seals commonly employed in vacuum sealing.

Figure 5:
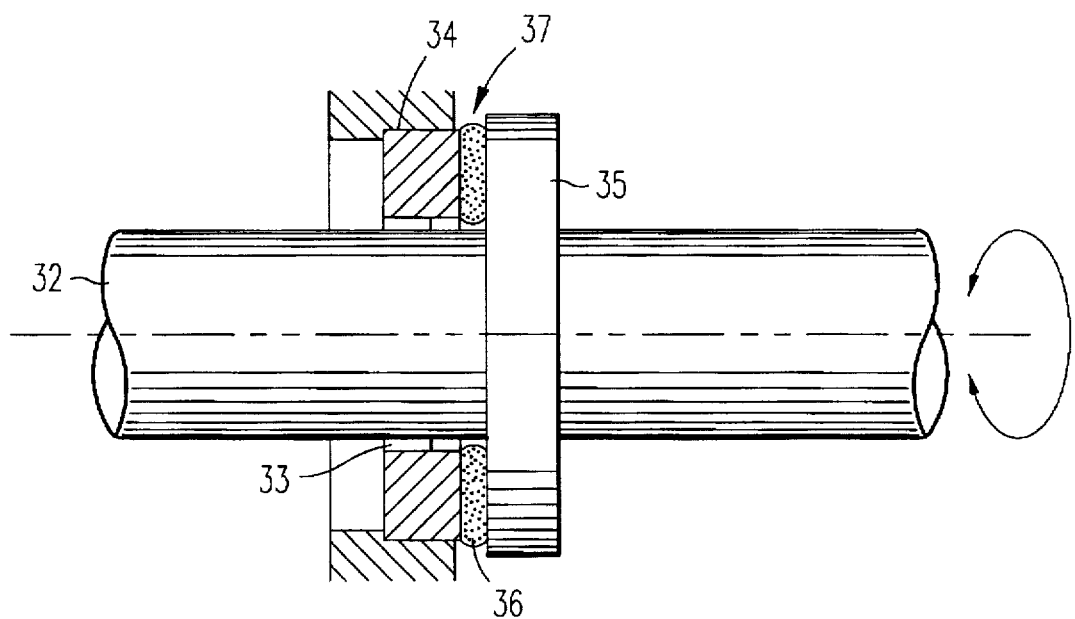
FIG. 5 is a partial cross-sectional view of a one-stage, magnetic sealing device, wherein a housing holds an annular, axially polarized magnet that surrounds a shaft, and the seal is formed between the magnet and a flange on the shaft.

FIG. 5 shows another magnetic sealing device of the present invention. This device is similar to that of FIG. 4 except that rod-like member 32 extends through opening 33 so that annular, axially-polarized magnet 34 annularly encircles rod-like member 32. Magnetically permeable member 35 is a flange on rod-like member 32 that faces magnet 34 in a closely spaced, noncontacting relationship. Magnetic sealant 36 is retained in gap 37. The seal thus formed can be a static seal or can accommodate rotary motion, as in a rotary feedthrough.

In another embodiment, the present invention provides a magnetic sealing device that can alternately seal and unseal an opening between two environments. In the sealed position, this device has a magnet (or magnet assembly) and a member in a closely spaced, non-contacting relationship to define a gap that is sealed by a magnetic sealant. In the unsealed position, the magnet (or magnet assembly) and member are spaced apart, thereby altering the flux path, so that seal formation is impossible.

Figure 6A:
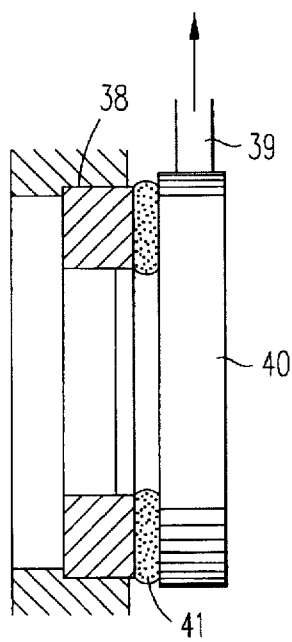
FIG. 6 is a cross-sectional view of a magnetic sealing device similar to that of FIG. 4, wherein the device is capable of sealing (6A) and unsealing (6B).
Figure 6B:
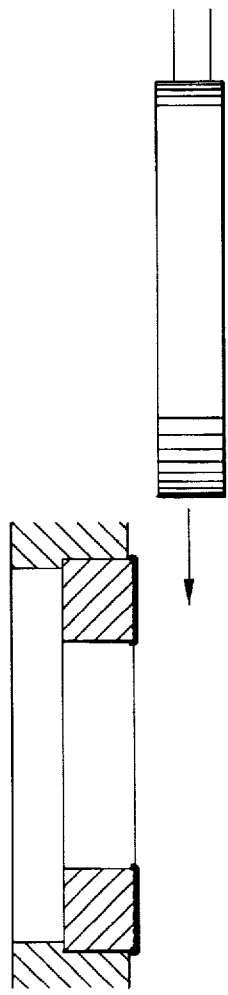

One variation of this embodiment is depicted in FIG. 6. FIG. 6A shows a magnetic sealing device similar to that of FIG. 4 in the sealed configuration, and FIG. 6B shows the device in the unsealed configuration. With reference to FIG. 6A, the device includes annular, axially polarized magnet 38 and movable member 39, which is either fully magnetically permeable or has magnetically permeable region 40 at a surface of member 39. (If desired, member 39 can be entirely magnetically permeable.) Member 39 has a first position relative to magnet 38 in which region 40 faces magnet 38 in a closely spaced, noncontacting relationship. As shown in FIG. 6B, member 39 can also be moved to a second position relative to magnet 38 in which region 40 is spaced apart from magnet 38. Magnetic sealant 41 is retained in contact with magnet 38 and provides a seal between magnet 38 and member 39 when member 39 is in the first position (FIG. 6A), but not when member 39 is in the second position (FIG. 6B).

In the device of FIG. 6, the magnetic sealant should be designed to reduce friction generated by the movement of the member in the direction indicated. For example, a solid-based sealant should include free-spinning molecules and/or a lubricant. In addition, those skilled in the art understand that the device of FIG. 6 can be modified to reduce friction. For instance, the device can be designed so that member 39 moves away from magnet 38 in a direction perpendicular to the plane of the gap. In such a device, the sealant need not contain free-spinning molecules or a lubricant.

Figure 7:
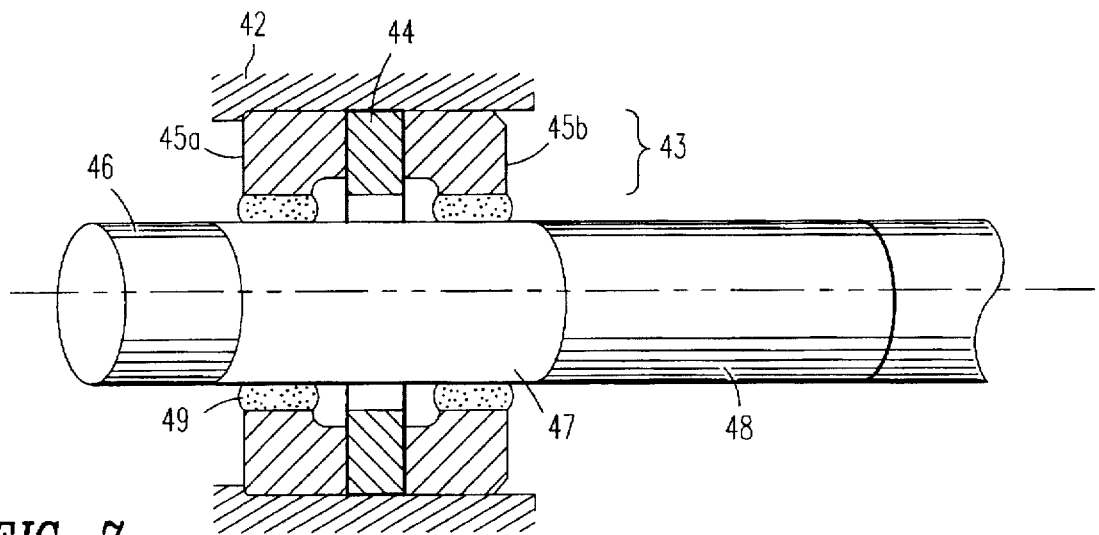
FIG. 7 is a partial cross-sectional view of a magnetic sealing device similar to that of FIG. 2, wherein the device is capable of sealing and unsealing.

Another variation of this embodiment is shown in FIG. 7. Housing 42 holds magnet assembly 43, which consists of annular, axially polarized magnet 44 and pole-piece elements 45a and 45b. Magnet assembly 43 is adapted to surround movable, rod-like member 46. Rod-like member 46 has a surface facing magnet assembly 43 in a closely spaced, noncontacting relationship. This surface has first region 47, which is magnetically permeable, and second region 48, which is magnetically nonpermeable. Rod-like member 46 has a first position relative to magnet assembly 43, in which first region 47 faces magnet assembly 43, and a second position relative to magnet assembly 43, in which second region 48 faces magnet assembly 43. Magnetic sealant 49 is retained in contact with magnet assembly 43 and provides a seal between magnet assembly 43 and rod-like member 46 when rod-like member 46 is in the first position, but not when the rod-like member 46 is in the second position. In this device, either the sealant is a solid-based magnetic sealant comprising magnetically permeable, free-spinning molecules and/or a lubricant, or the sealant is a liquid-based sealant, such as a ferrofluid.

The present invention encompasses such modifications of the devices of FIGS. 4–7 as are readily apparent to those skilled in the art. For example, devices in which the locations of the magnet and the magnetically permeable regions are reversed (as in FIG. 3) are within the scope of the invention. In addition, the invention encompasses devices similar to those of FIGS. 6 and 7 wherein the magnet is movable and the member is stationary as well as devices wherein both elements are movable.

Method for Unsealing a Magnetic Seal

The present invention also provides a method for unsealing a magnetic seal, such as that described in the previous embodiment. In general, unsealing is accomplished by removing a closely spaced, non-contacting relationship between a magnet (or magnet assembly) and a magnetically permeable member. This relationship can be removed by moving the magnet, the member, or both. The device can be resealed by reestablishing the closely spaced, noncontacting relationship between the magnet and member.

With reference to FIG. 6A, one variation of this embodiment comprises providing member 39 in a first position relative to magnet 38 so that magnetically permeable region 40 of member 39 faces magnet 38 in a closely spaced, noncontacting relationship to define a gap. The method additionally comprises providing magnetic sealant 41 retained in contact with magnet 38 so that member 39 contacts magnetic sealant 41 when member 39 is in the first position. As magnetic sealant 41 occupies the gap, this first position corresponds to the sealed position for the device. The device is unsealed (FIG. 6B) by moving member 39 to a second position relative to magnet 38, wherein magnetically permeable region 40 of member 39 is spaced apart from magnet 38, thereby removing the contact between member 39 and magnetic sealant 41.

Another variation of the unsealing method is used in a device including a magnet (or magnet assembly) and a member having a surface facing the magnet in a closely spaced, noncontacting relationship, such as in the exemplary device shown in FIG. 7. The method comprises providing magnetic sealant 49 retained in contact with magnet assembly 43 and rod-like member 46. Rod-like member 46 has first, magnetically permeable region 47 and second, magnetically nonpermeable region 48 at the surface of rod-like member 46. Rod-like member 46 is provided in a first position, wherein first region 47 is proximal to magnet assembly 43 so that rod-like member 46 contacts magnetic sealant 49, thus sealing the device. The device is unsealed by moving rod-like member 46 to a second position, wherein second region 48 is proximal to magnet assembly 43, thereby removing the contact between rod-like member 46 and magnetic sealant 49.

Other Applications for the Solid-Based Medium

The solid-based medium of the present invention is useful as a lubricant, a bearing, an electrical conductor or insulator, and/or a thermal conductor, in addition to serving as a magnetic sealant. The present invention includes devices wherein the solid-based medium performs any of these functions, singly or in combination, while maintained in a selected position within a device by the use of a magnetic field. Such devices have a wide variety of possible configurations, several of which are described herein. These descriptions are intended as nonlimiting illustrations, as modifications of the described devices are readily apparent to those skilled in the art, in light of the present disclosure.

In one embodiment, the solid-based medium is magnetically permeable. This solid-based medium is magnetically coupled to the magnetic field, and thereby retained in position in the same manner as described above for magnetic sealing devices. Possible configurations for the device of this embodiment (hereinafter termed the "magnetic coupling embodiment") include those shown in FIGS. 1–7.

For simplicity, the device of the magnetic coupling embodiment is described with reference to FIG. 1. In this device, reference numeral 1 refers to a first member (rather than a housing, as described above) which holds magnet 2. Member 3 is a second member having magnetically permeable region 5 at a surface facing magnet 2. Alternatively, second member 3 can be entirely magnetically permeable. Magnet 2 extends into a closely spaced, noncontacting relationship with the surface of second member 3, defining gap 4 between magnet 2 and second member 3. Magnetically permeable, solid-based medium 7 is retained in the gap. Solid-based medium 7 can be a solid-based magnetic sealant, as described above, or can be any of the media described below.

In another embodiment, a magnetic seal is used to contain the solid-based medium in a cavity between two members. (This embodiment is referred to hereinafter as the "containment embodiment.") The solid-based medium of this device need not be magnetically permeable. Two possible configurations for such a device are shown in FIGS. 2 and 3. Referring to FIG. 2, reference numeral 8 refers to a first member (rather than a housing, as described above) which holds magnet assembly 9. Magnet assembly 9 includes magnet 10 and magnetically permeable pole piece elements 11a and 11b. Member 12 is a second member having magnetically permeable region 14 at a surface facing magnet assembly 9. Alternatively, second member 12 can be entirely magnetically permeable. Magnetically permeable pole piece elements 11a and 11b extend into a closely spaced, noncontacting relationship with the surface of second member 12, defining gaps 13a and 13b between pole piece elements 11a and 11b and second member 12. Gaps 13a and 13b are sealed by magnetic sealant 16a. Magnet 10, pole piece elements 11a and 11b, sealant 16a, and second member 12 enclose cavity 16b, which contains the solid-based medium of the present invention. The solid-based medium can be a solid-based magnetic sealant or can be any of the media described herein.

In a variation of this embodiment, the solid-based medium is magnetically permeable and also serves as the magnetic sealant. An advantage associated with using the same composition as solid-based medium and magnetic sealant is that the solid-based medium can replace any magnetic sealant lost from the gaps between the pole piece elements and the second member.

The magnetic field is formed in such devices as described above for magnetic sealing devices. Therefore, for the most part, the considerations discussed above with respect to magnetic sealing devices apply to any device wherein a magnetic field is used to maintain a solid-based medium in a suitable position. For instance, in devices of the containment embodiment, the requirements for the magnet are the same as those discussed above. In addition, these same requirements also apply to devices of the magnetic coupling embodiment wherein the solid-based medium serves as a sealant in addition to performing another function (such as, for example, an electrical conductor).

When sealing is not required in devices of the magnetic coupling embodiment, however, the magnetic field need not be as strong as in magnetic sealing devices. Accordingly, the size of the gap occupied by the solid-based medium can be larger than the gap in magnetic sealing devices and/or the magnet can be weaker than that required to form a magnetic seal.

The devices described below employ a solid-based medium that can comprise cage/tube-based molecules. Such molecules are particularly useful in all of the devices of the present invention because of their exceptional stability and resilience. These properties ensure good performance in corrosive and/or vacuum environments and over a longer lifetime than is possible with conventional media. The solid-based medium can also be a composition comprising particles. In addition, the solid-based medium can comprise a mixture of cage/tube-based molecules and particles having properties suitable for the particular application. If desired, to prevent outgassing, for example, the solid-based medium can be liquid-free.

As stated above, some devices employ a solid-based medium that is magnetically permeable. This magnetically permeable solid-based medium can comprise magnetically permeable, cage/tube-based molecules and/or magnetically permeable particles that are of a suitable size to align in a magnetic field. The solid-based medium can also comprise a mixture of magnetically permeable and magnetically nonpermeable components, provided the magnetically nonpermeable component is retained in a magnetic field with the magnetically permeable component (as a consequence, for example, of molecular size or electron stripping). The requirements for magnetically permeable cage/tube-based molecules and magnetically permeable particles have been described above. In devices of the magnetic coupling embodiment, the degree of magnetization can be lower than that required for magnetic sealing when such sealing is not necessary.

Device Employing the Solid-based Medium as a Lubricant

In one group of embodiments, the solid-based medium serves as a lubricant (hereinafter termed a "solid-based lubricant"). According to the invention, magnetic coupling or containment is used to maintain the solid-based lubricant in the vicinity of at least two members that move relative to one and other. In the containment embodiment, the magnetic sealant can be any magnetic sealant described herein or known in the prior art.

In either embodiment, the solid-based lubricant can comprise cage/tube-based molecules, such as fullerenes. The cage/tube-based molecules can comprise free-spinning molecules, such as, for example, $C_{60}$ and/or $C_{70}$. The ability to spin freely, with little or no friction, significantly reduces wear on the members to be lubricated.

If the cage/tube-based molecules are to serve as the magnetically permeable component of the solid-based lubricant (in the magnetic coupling embodiment, for example) the cage/tube-based molecules are magnetically permeable. In a variation of this embodiment, the magnetically permeable, cage/tube-based molecules comprise $C_{60}$ iron-fullerene complexes.

The solid-based lubricant can also comprise particles. The particles can be any particles having lubricant properties. Suitable particles include those derived from graphite and graphite derivatives, such as graphite-fluoride; metals, including bronze, indium, lead, silver, tin, and zinc; as well as compounds such as molybdenum disulfide, niobium selenide, and tungsten disulfide. Steel or iron particles can be used if treated by the NI-SURF gas nitriding process (Alloy Hard Surfacing, Inc, San Jose, Calif.). Suitable particles can also be derived from plastics, including acrylonitrile butadiene styrene (ABS); acetals; nylons, such as type 6 and 6/6 nylon; polyesters, such as polybutylene terephthalate; TEFLON; and plastic "alloys," such as ABS/polyurethane.

If the particles are to serve as the magnetically permeable component of the solid-based lubricant, the particles are magnetically permeable. Suitable magnetically permeable particles include NI-SURF-treated iron and NI-SURF-treated magnetically permeable steel particles.

In addition, the solid-based lubricant of the present invention can comprise a combination of cage/tube-based molecules with suitable particles as well as combinations of cage/tube-based molecules and/or particles with other substances. In particular, the molecules and/or particles of the present invention can be combined with liquids. However, the inclusion of liquids in the solid-based lubricant can lead to the problems associated with liquids discussed above.

An exemplary application of the containment embodiment of the present invention is the lubrication of balls in a bearing race. The race consists of a cavity, which is sealed by a magnetic seal. The cavity contains balls and the solid-based lubricant, which ensures a long-lasting, lubricated bearing.

Device Employing the Solid-Based Medium as a Bearing

The solid-based medium can also function as a bearing (hereinafter a "solid-based bearing"). Magnetic coupling or containment is used to maintain the solid-based bearing in the vicinity of at least at least one member to be supported. In the containment embodiment, the magnetic sealant is a solid-based magnetic sealant that also serves as a bearing. This magnetic sealant is therefore termed a "solid-based sealant/bearing."

In both the magnetic coupling and containment embodiments, the solid-based bearing can comprise cage/tube-based molecules, such as fullerenes and met-cars. Fullerenes provide a particularly useful solid-based bearing because these molecules are known to be compliant as well as elastic. These properties provide vibration damping and allow the solid-based bearing to compensate for any misalignments between the supported member and, for example, a housing. In a variation of this embodiment, the cage/tube-based molecules comprise free-spinning molecules, such as, $C_{60}$ and/or $C_{70}$. The use of free-spinning molecules in the solid-based bearing facilitates movement of the supported member.

If the cage/tube-based molecules are to serve as the magnetically permeable component of the solid-based bearing, the cage/tube-based molecules are magnetically permeable. In one variation of this embodiment, the magnetically permeable, cage/tube-based molecules comprise $C_{60}$ iron-fullerene complexes.

The solid-based bearing can also comprise particles. The particles can be any particles capable of withstanding the compressive forces encountered in the bearing device. Suitable particles include those derived from carbon; graphite; carbon-graphite; brass; bronze; and plastics, including fluorocarbons (such as polytetrafluoroethylene), nylons (such as type 6 and 6/6 nylon), polyesters (such as polybutylene terephthalates), and polyimides (such as VESPEL). Also suitable are NI-SURF-treated iron and/or steel particles.

If the particles are to serve as the magnetically permeable component of the solid-based bearing, the particles are magnetically permeable. Suitable magnetically permeable particles include NI-SURF-treated iron and NI-SURF-treated magnetically permeable steel particles.

In addition, the solid-based bearing of the present invention can comprise a combination of cage/tube-based molecules with suitable particles as well as combinations of cage/tube-based molecules and/or particles with other substances. In particular, the molecules and/or particles of the present invention can be combined with liquids.

The solid-based sealant/bearing of the containment embodiment can comprise magnetically permeable cage/tube-based molecules and/or magnetically permeable particles. Molecules and particles suitable for use in the solid-based sealant/bearing are those described above for use in the solid-based bearing.

Devices Employing the Solid-Based Medium as an Electrical Conductor and an Electrical Insulator In another group of embodiments, the solid-based medium serves as an electrical conductor. In this group of embodiments, an electrically conductive solid-based medium (hereinafter referred to as "solid-based electrical conductor") can be employed in electrically coupling two members, which can be movable relative to one and other. In addition, the solid-based electrical conductor is useful to prevent the build-up of static electricity.

The solid-based electrical conductor can be maintained in position by magnetic coupling or containment. The magnetic coupling embodiment can be employed in an electrical coupling device analogous to the magnetic sealing device that is capable of sealing and unsealing (FIGS. 6 and 7). Such a device can be structurally identical to the devices of FIGS. 6 and 7, however, a solid-based electrical conductor is substituted for the solid-based magnet sealant. Electrical coupling and uncoupling is accomplished in the same manner as sealing and unsealing, which is discussed above, with reference to FIGS. 6 and 7. In the containment embodiment, the magnetic sealant can be any magnetic sealant described herein or known in the prior art.

In either embodiment, the solid-based electrical conductor can comprise cage/tube-based molecules. Met-cars are inherently conductive due to their metal content and can thus be used in the solid-based electrical conductor of the present invention without modification. Preferably, good electrical conductors, such as aluminum, cadmium, copper, gold, silver, tungsten, or zinc are used to produce met-cars employed in the solid-based electrical conductor.

Fullerenes are reportedly semiconductors when packed together in a face-centered cubic lattice. The conductivity of these molecules can be increased by doping fullerenes with alkali metal atoms such as potassium or rubidium to form a stable metallic crystal. When potassium or rubidium is used to dope $C_{60}$, for example, maximal electrical conductivity is achieved with a ratio of three alkali metal atoms to one $C_{60}$ molecule. Cooling $K_3C_{60}$ to below −255° C. (18° K.) produces a superconductor, whereas the critical temperature for superconductivity is near −253° C. (30° K.) for $Rb_3C_{60}$. Thus, metal-doped fullerenes can be used in the solid-based electrical conductor of the present invention to provide a wide range of conductivities.

If the cage/tube-based molecules are to serve as the magnetically permeable component of the solid-based electrical conductor, the cage/tube-based molecules are magnetically permeable. Suitable magnetically permeable, cage/tube-based molecules can be generated, for example, by using cobalt to produce met-cars or to dope fullerenes.

The solid-based electrical conductor can also comprise particles. The particles can be derived from any material that is sufficiently electrically conductive for the particular application. Suitable materials include metals such as aluminum, cadmium, cobalt, copper, gold, silver, tungsten, zinc, and alloys thereof. Other suitable materials include carbon, graphite, carbon-graphite, and niobium selenide.

If the particles are to serve as the magnetically permeable component of the solid-based electrical conductor, the particles are magnetically permeable. Suitable magnetically permeable particles include those derived from cobalt and cobalt alloys.

Figure 8:
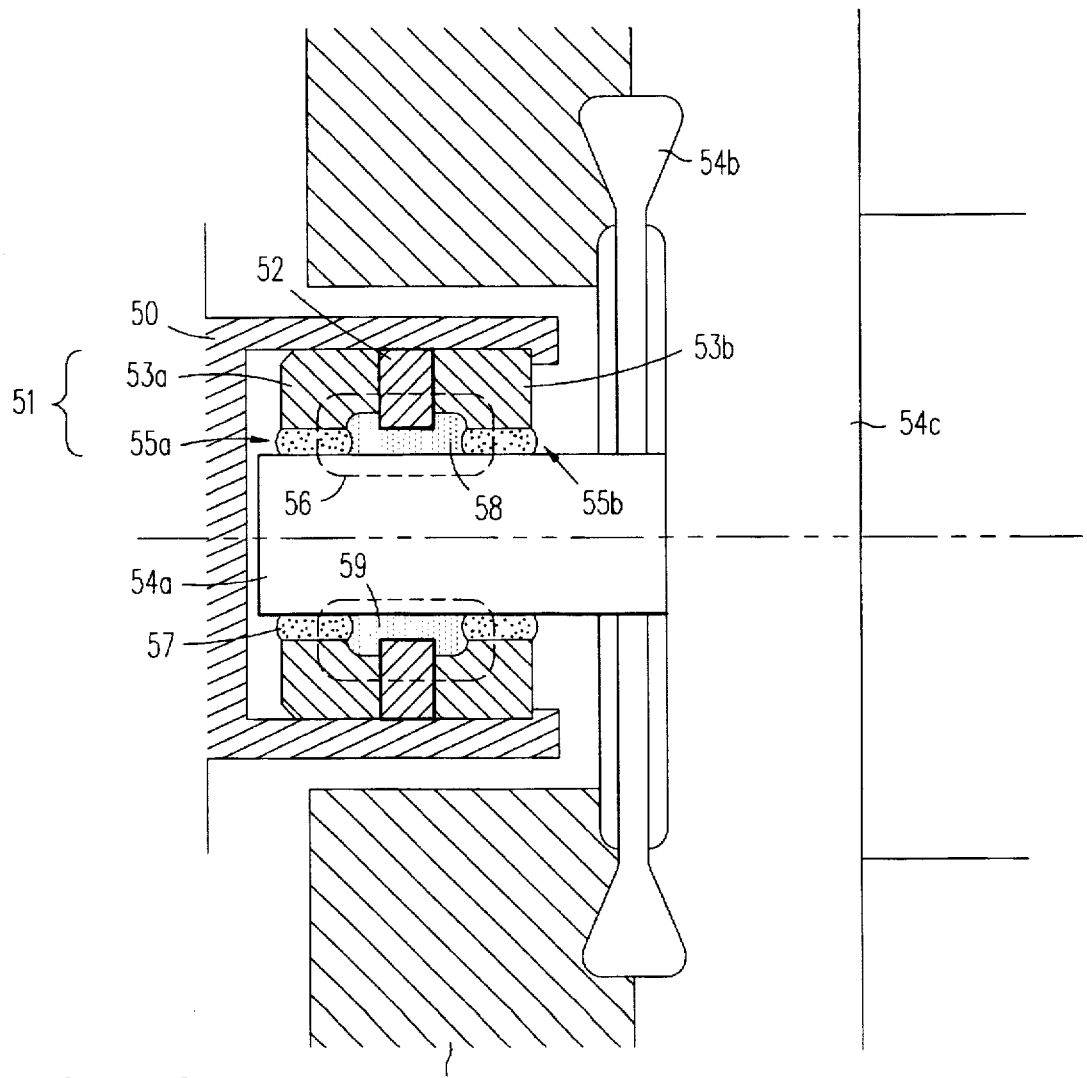
FIG. 8 is a cross-sectional view of an electrical power feedthrough, wherein a housing holds an annular, axially polarized magnet assembly that surrounds an electrode and forms a magnetic seal therewith. The resultant radial cavity between the magnet assembly and the electrode contains a solid-based electrical conductor.

One application of the solid-based electrical conductor is shown in FIG. 8. The device pictured is an electrical feedthrough, which can be used, for example, to transfer a bias from one environment to another in ultra-high vacuum applications. Housing 50 holds magnet assembly 51, which includes annular, axially polarized magnet 52 sandwiched between two pole-piece elements 53a and 53b. Pole-piece elements 53a and 53b are in a contacting, magnetic-flux relationship with each end of magnet 52. Magnet assembly 51 is adapted to annularly surround electrode 54a, which can be movable or stationary. Pole piece elements 53a and 53b extend into a closely spaced, noncontacting relationship with the surface of electrode 54a to define radial gaps 55a and 55b. Electrode 54a is either fully magnetically permeable or has magnetically permeable region 56 at the surface of electrode 54 opposite magnet assembly 51. Magnetic sealant 57 is retained in gaps 55a and 55b to form a two-stage magnetic seal that seals radial cavity 58. Cavity 58 contains solid-based electrical conductor 59. Electrode 54a can, in one embodiment, be part of a commercially available electrical feedthrough 54c supplied, for example, by MDC Corporation, Hayward, Calif. Mounted between feedthrough 54c and housing 54d is a metal seal 54b which mates with housing 54c to provide an additional sealing function.

In another embodiment, the present invention provides a device employing a solid-based medium as an electrical insulator (hereinafter referred to as a solid-based electrical insulator). This device can be structurally identical to the device employing a solid-based medium as an electrical conductor, differing only in that the insulating device includes a solid-based insulator, rather than a solid-based conductor.

The solid-based electrical insulator can comprise insulating cage/tube-based molecules. In particular, fullerenes can be rendered insulators by doping with greater amounts of alkali metal atoms than used to enhance conductivity. $C_{60}$, for example, is converted to an insulator by doping with potassium or rubidium at dopant:$C_{60}$ ratios greater than 3:1.

The solid-based electrical insulator can also comprise particles, which can be derived from any insulating material. Suitable materials include plastics such as alkyds and thermoset carbonate.

In addition, the solid-based electrical conductor or insulator of the present invention can comprise a combination of cage/tube-based molecules with suitable particles as well as combinations of cage/tube-based molecules and/or particles with other substances. In particular, the molecules and/or particles of the present invention can be combined with liquids.

Devices Employing the Solid-Based Medium as a Thermal Conductor

The solid-based medium also functions as an thermal conductor. In this group of embodiments, a thermally conductive solid-based medium (hereinafter referred to as "solid-based thermal conductor") can be use to promote heat dissipation away from a heat-producing element. The solid-based thermal conductor can be maintained in the vicinity of the heat-producing element by magnetic coupling or containment. The magnetic coupling embodiment can be employed in a thermal coupling device analogous to the magnetic sealing device that is capable of sealing and unsealing (FIGS. 6 and 7). In the containment embodiment, the magnetic sealant can be any magnetic sealant described herein or known in the prior art.

In either embodiment, the solid-based thermal conductor can comprise cage/tube-based molecules. Such molecules provide a large surface area, which aids in heat dissipation. Met-cars are inherently thermal conductors due to their metal content. The thermal conductivity of fullerenes can be enhanced by doping fullerenes with metals. Preferably, good thermal conductors, such as aluminum, copper, gold, magnesium, molybdenum, silver, or tungsten, are used to produce met-cars and/or dope fullerenes employed in the solid-based thermal conductor.

If the cage/tube-based molecules are to serve as the magnetically permeable component of the solid-based electrical conductor, the cage/tube-based molecules are magnetically permeable. Suitable magnetically permeable, cage/tube-based molecules can be generated, for example, by using cobalt to produce met-cars or to dope fullerenes.

The solid-based thermal conductor can also comprise particles. The particles can be derived from any material that is sufficiently thermally conductive for the particular application. Suitable materials include aluminum, copper, gold, magnesium, molybdenum, silver, or tungsten, and alloys thereof, as well as graphite.

If the particles are to serve as the magnetically permeable component of the solid-based thermal conductor, the particles are magnetically permeable. Suitable magnetically permeable particles include those derived from cobalt and cobalt alloys.

In addition, the solid-based thermal conductor of the present invention can comprise a combination of cage/tube-based molecules with suitable particles as well as combinations of cage/tube-based molecules and/or particles with other substances. In particular, the molecules and/or particles of the present invention can be combined with liquids.

Figure 9:
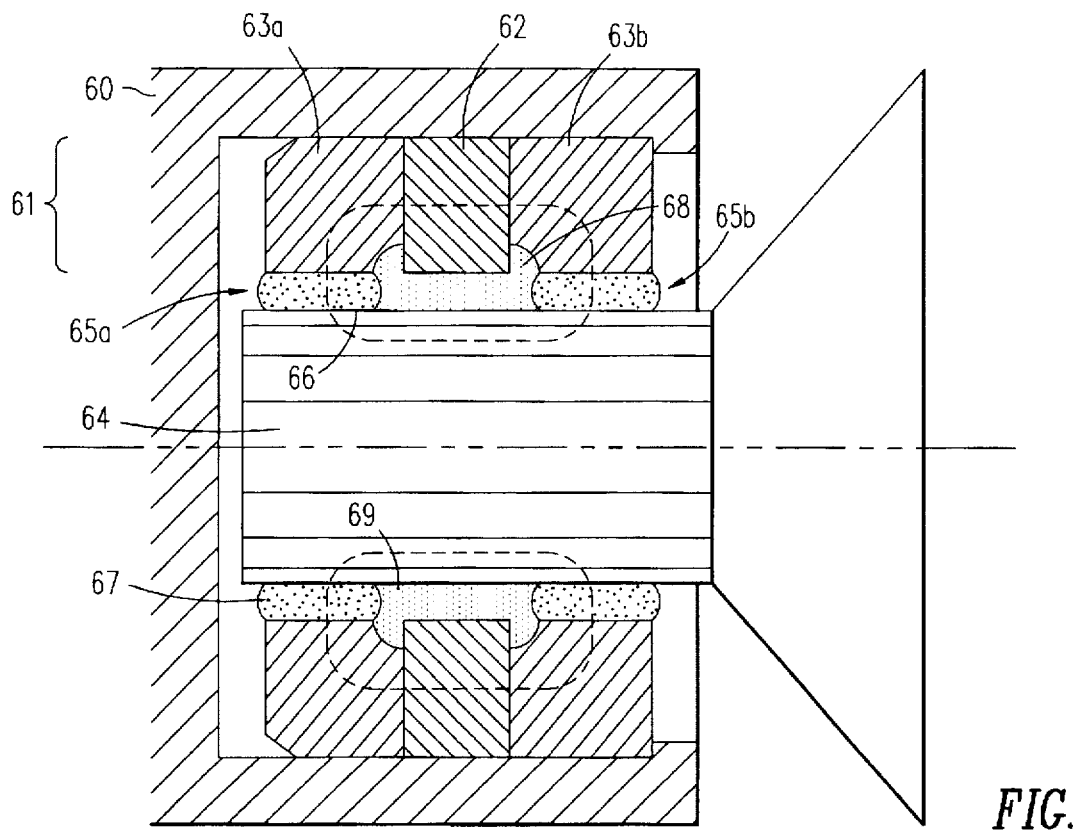
FIG. 9 is a cross-sectional view of a cooling device in a loudspeaker, wherein an outer housing holds an annular, axially polarized magnet assembly that surrounds an inner housing and forms a magnetic seal therewith. The resultant radial cavity between the magnet assembly and the inner housing contains a solid-based thermal conductor.

This embodiment can be applied, for example, to cooling the copper coil of a loudspeaker, as shown in FIG. 9. Outer housing 60 holds magnet assembly 61, which includes annular, axially polarized magnet 62 sandwiched between two pole-piece elements 63a and 63b. Pole-piece elements 63a and 63b are in a contacting, magnetic-flux relationship with each end of magnet 62. Magnet assembly 61 is adapted to annularly surround inner housing 64, which contains the speaker coil (not shown). Pole piece elements 63a and 63b extend into a closely spaced, noncontacting relationship with the surface of inner housing 64 to define radial gaps 65a and 65b. Inner housing 64 is either fully magnetically permeable or has magnetically permeable region 66 at the surface of inner housing 64 opposite magnet assembly 61. Magnetic sealant 67 is retained in gaps 63a and 63b to form a two-stage magnetic seal that seals radial cavity 68. Cavity 68 contains solid-based thermal conductor 69. This application of the solid-based thermal conductor improves heat transfer away from the speaker coil, and thus increases the loudspeaker's power output capability.

Figure 10:
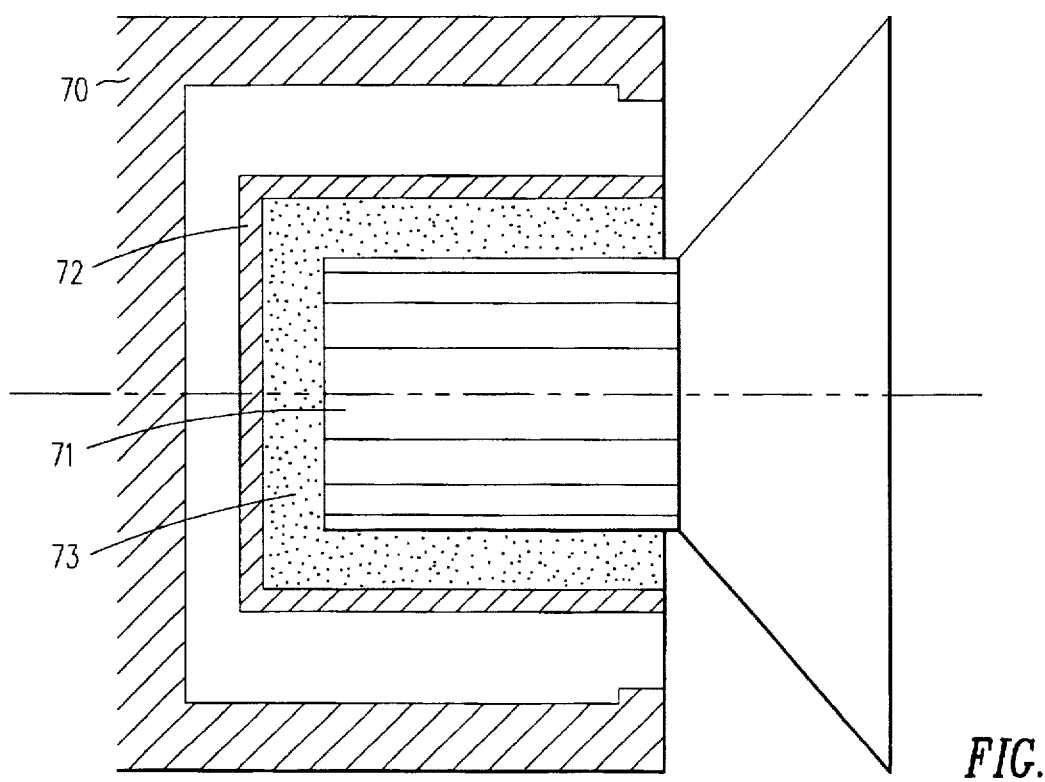
FIG. 10 is a cross-sectional view of a cooling device in a loudspeaker, wherein a container maintains a solid-based thermal conductor in contact with an inner housing.

In a further embodiment, the solid-based thermal conductor is maintained in position within a device using a container, rather than a magnetic field. Accordingly, the solid-based thermal conductor need not be magnetically permeable. Rather, a container surrounds at least a portion of a heat-producing element in the device, and the solid-based thermal conductor is packed into the container, around the heat-producing element. Applications for this embodiment include cooling a speaker coil, as shown in FIG. 10. Outer housing 70 surrounds container 72, which, in turn, surrounds inner housing 71, containing the speaker coil (not shown). Container 72 contains solid-based thermal conductor 73, maintaining solid-based thermal conductor 73 in contact with inner housing 70, thereby promoting heat transfer away from the speaker coil.

Devices Wherein the Solid-Based Medium Serves a Plurality of Functions

As stated above, the solid-based medium of the present invention can function as a magnetic sealant, a lubricant, a bearing, an electrical conductor or insulator, a thermal conductor, or a combination thereof. Exemplary combinations of functions include: magnetic sealant plus any other function, lubricant/bearing, magnetic sealant/lubricant/bearing. A solid-based medium suitable for such combined functions can readily be designed by those skilled in the art in light of the teachings herein.

For example, a solid-based medium that serves as a magnetic sealant/lubricant/bearing in the magnetic coupling embodiment can comprise $C_{60}$ iron-fullerene complexes. Such molecules are magnetically permeable as well as lubricating and, in addition, have the ability to withstand compressive forces. Alternatively, a solid-based magnetic sealant/lubricant/bearing can comprise a solid composition containing iron and bronze particles of a suitable size to align in a magnetic field. The iron particles provide magnetic permeability, and the bronze particles provide lubrication and resistance to compression.

This invention is further illustrated by the following specific but non-limiting examples. Procedures that are constructively reduced to practice are described in the present tense, and procedures that have been carried out in the laboratory are set forth in the past tense.

EXAMPLE 1

An axial Ultra-High Vacuum Feedthrough

Figure 11:
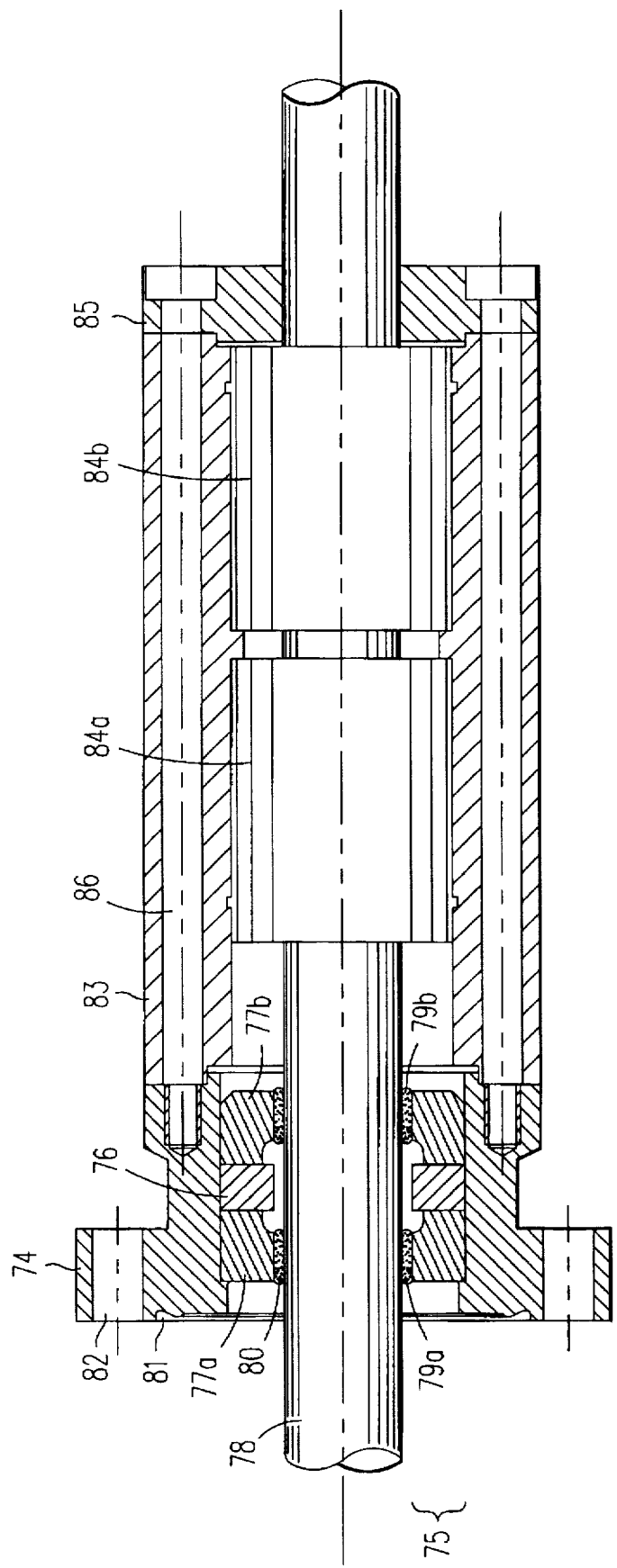
FIG. 11 is a cross-sectional view of an axial ultra-high vacuum feedthrough comprising a magnetic sealing device having an annular, axially polarized magnet assembly that includes pole piece elements.

An axial ultra-high vacuum feedthrough comprising a solid-based magnetic seal was constructed as indicated in FIG. 11. Magnet housing 74 holds magnet assembly 75, which includes annular, axially polarized magnet 76, sandwiched between two pole-piece elements 77a and 77b. Pole-piece elements 77a and 77b are in a contacting, magnetic-flux relationship with each end of magnet 76. Magnet assembly 75 is adapted to annularly surround magnetically permeable shaft 78, which moves axially. Pole piece elements 77a and 77b extend into a closely spaced, noncontacting relationship with the surface of shaft 78 to define radial gaps 79a and 79b. Approximately 0.1 mg solid-based magnetic sealant 80 is retained in gaps 79a and 79b to form a two-stage magnetic seal. Magnet housing 74 also holds metal seal 81, which annularly surrounds shaft 78 on one side of the magnetic seal. Magnet housing 74 has bolt holes 82 for attaching magnet housing 74 to other devices.

Bearing housing 83 is connected to magnet housing 74 on the side of magnet housing 74 opposite metal seal 81. Bearing housing 83 contains linear bearings 84a and 84b, which annularly surround shaft 78. End cap 85 is attached to bearing housing 83 at the end of bearing housing 83 opposite magnet housing 74. Attachment bolt holes 86 extend through end cap 85 and bearing housing 83, and into magnet housing 74.

The specifications for the individual parts of the feedthrough were as follows:

Magnet, Ring:
Inner Diameter: ⅝" (nominal)
Material: NdFeB
Grade: MGO (Million Gauss-Oersteds) 37
Magnetization: Axial
Pole Piece Elements:
Inner Diameter: ⅝" (nominal)
Material: CARPENTER 49 (48% NiFe Alloy)
Magnet Housing:
Material: 316L Stainless Steel
Housing-to-vacuum chamber seal: Metal, CONFLAT
Magnetically permeable shaft:
Diameter: ⅝" (nominal)
Material: 1060 Steel, 60/65 Rc (Rockwell) Hardness
Supplier: Thompson
Solid-Based Magnetic Sealant:
Material: Iron-fullerene complex
Supplier: MER Corporation, Tucson, Ariz.
Bearing Housing:
Material: 6061 Aluminum
Bearings:
Linear Ball Bushing
Inner Diameter: ⅝" (nominal)
Supplier: Thompson
Gap Size (Pole Piece Elements/Shaft):
Less that 0.003"

After assembly of the feedthrough, the magnetic seal was formed by injecting approximately 0.1 mg iron-fullerene complex into the gap region using a syringe. The feedthrough was connected to a small mechanical vacuum pump via the bolt holes on the magnet housing. A manual valve was located between the feedthrough and the pump. A Granville-Phillips Convection Tube (hereinafter "pressure gage") was located between the valve and the feedthrough to measure the pressure on side of the valve nearest the feedthrough. At atmospheric pressure, the gage read 705 Torr (T)

Two tests where conducted to determine the pressure differential capability of the magnetic seal in the feedthrough. The first test was a static test, wherein the shaft was stationary, and the second test was a dynamic test, wherein the shaft was moved axially and rotationally. In each test, the pump was turned on, the valve was opened, and pressures were measured as a function of time. The results of the static test are shown in Table I, the results of the dynamic test are shown in Table II.

TABLE I

Static Test

| Time (minutes) | Pressure (T) | Pressure (psi) |
| --- | --- | --- |
| 0 | 705.0 | 13.19 |
|  | Valve opened |  |
| 1 | 205.0 | 3.84 |
| 2 | 155.0 | 2.90 |
| 3 | 80.0 | 1.50 |
| 3.5 | 50.0 | 0.96 |
| 4 | 45.0 | 0.84 |
| 4.5 | 40.0 | 0.75 |
| 5 | 35.0 | 0.65 |
| 5.5 | 29.0 | 0.54 |
| 6 | 23.0 | 0.43 |
| 6.5 | 20.4 | 0.38 |
| 7 | 20.2 | 0.38 |
| 7.5 | 20.0 | 0.37 |
| 8 | 19.7 | 0.37 |
| 9 | 19.4 | 0.36 |
| 10 | 19.2 | 0.36 |
| 11.5 | 19.0 | 0.36 |
| 12 | 18.8 | 0.35 |
|  | Valve closed |  |
| 13 | 20.0 | 0.37 |
| 14 | 180.0 | 3.36 |
| 15 | 680–685 | 12.72–12.82 |

The results of the static test indicate that two-stage magnetic seal of the feedthrough was capable of maintaining a pressure differential of at least 12.84 psi (see time=12 minutes) or 6.42 psi/stage.

TABLE II

Dynamic Test

| Time (minutes) | Pressure (T) | Pressure (psi) |
| --- | --- | --- |
| 0 | 705.0 | 13.19 |
|  | Valve opened |  |
| 1 | 23.4 | 0.44 |
| 2 | 20.4 | 0.38 |
|  | Shaft moved axially (approximately 1 inch) back and forth and rotationally from time = 3–5 minutes |  |
| 3 | 30 | 0.56 |
| 4 | 35–45 | 0.64–0.84 |
| 5 | 35–45 | 0.64–0.84 |
|  | Valve closed |  |

The results of the dynamic test indicate that two-stage magnetic seal of the feedthrough was capable of maintaining a pressure differential of approximately 12.35–12.55 psi (see time=4–5 minutes) while the shaft was being moved axially or rotationally.

What is claimed is:

1. A method for unsealing and resealing a gap between a magnet and a member having a surface facing the magnet in a closely spaced, noncontacting relationship, comprising:
   (a) providing an assembly including
      (i) the magnet; and
      (ii) the member, wherein the member is movable between a first position and a second position, relative to the magnet, in said assembly;
   (b) providing
      (i) a first, magnetically permeable region on the surface of the member; and
      (ii) a second, magnetically nonpermeable region on the surface of the member, the member occupying a first position, wherein the first region is proximal to the magnet;
   (c) retaining a solid-based medium in contact with the magnet, the member contacting the solid-based medium when the member is in the first position;
   (d) moving the member from the first position to a second position, wherein the second region is proximal to the magnet, thereby removing the contact between the member and the solid-based medium; and
   (e) moving the member from the second position back to the first position, thereby reestablishing the contact between the member and the solid-based medium.

2. The method of claim 1, wherein the solid-based medium is selected from the group consisting of a solid-based magnetic sealant, solid-based lubricant, a solid-based bearing, a solid-based electrical conductor, a solid-based electrical insulator, and a solid-based thermal conductor.

3. The method of claim 1, wherein the solid-based medium comprises magnetically permeable, free-spinning molecules.

4. The method of claim 1, wherein the solid-based medium is a medium comprising a fullerene.

5. The method of claim 4, wherein the fullerene is $C_{60}$.

6. The method of claim 1, wherein the solid-based medium is a medium comprising a metallo-carbohydrene or a derivative thereof.

7. The method of claim 1, wherein the solid-based medium comprises magnetically permeable molecules, a portion of said molecules each including a carbon atom and having a molecular structure wherein one element of the structure is selected from the group consisting of a cage and a tube.

8. The method of claim 7, wherein at least a portion of the magnetically permeable molecules each comprise at least one metal atom.

9. The method of claim 8, wherein said portion of the magnetically permeable molecules comprises metallo-fullerene complexes.

10. The method of claim 9, wherein the metallo-fullerene complexes comprise a metal selected from the group consisting of iron, cobalt, and nickel.

11. The method of claim 1 wherein the member is a rod-like member and the magnet is an annular magnet encircling the rod-like member.

12. A method for unsealing and resealing a gap between a magnetically permeable pole piece element and a member having a surface facing the pole piece element, comprising:
   (a) providing an assembly including
      (i) a magnet; and
      (ii) the magnetically permeable pole piece element; wherein a first end of the pole piece element is in a magnetic-flux relationship with the magnet; and
      (iii) the member, wherein the member is movable between a first position and a second position, relative to a second end of the pole piece element, in said assembly;
   (b) providing (i) a first, magnetically permeable region on the surface of the member; and (ii) a second, magnetically nonpermeable region on the surface of the member, the member occupying a first position, wherein the first region faces a second end of the pole piece element in a closely spaced, noncontacting relationship;

(c) retaining a solid-based medium in contact with the second end of the pole piece element and the first region of the member when the member is in the first position;

(d) moving the member from the first position to a second position, wherein the second region faces the second end of the pole piece element in a closely spaced, noncontacting relationship, thereby removing the contact between the member and the solid-based medium; and (e) moving the member from the second position back to the first position, thereby reestablishing the contact between the member and the solid-based medium.

13. The method of claim 12 wherein the member is a rod-like member, the magnet is an annular magnet encircling the rod-like member, and the pole piece element is an annular pole piece element encircling the rod-like member.

14. The method of claim 12, wherein the solid-based medium comprises magnetically permeable molecules, a portion of said molecules each including a carbon atom and having a molecular structure wherein one element of the structure is selected from the group consisting of a cage and a tube.

15. The method of claim 12, wherein the solid-based medium is selected from the group consisting of a solid-based magnetic sealant, solid-based lubricant, a solid-based bearing, a solid-based electrical conductor, a solid-based electrical insulator, and a solid-based thermal conductor.

16. The method of claim 12, wherein the solid-based medium comprises magnetically permeable, free-spinning molecules.

17. The method of claim 12, wherein the solid-based medium is a medium comprising a fullerene.

18. The method of claim 17, wherein the fullerene is $C_{60}$.

19. The method of claim 12, wherein the solid-based medium is a medium comprising a metallo-carbohydrene or a derivative thereof.

20. The method of claim 14, wherein at least a portion of the magnetically permeable molecules each comprise at least one metal atom.

21. The method of claim 20, wherein said portion of the magnetically permeable molecules comprises metallo-fullerene complexes.

22. The method of claim 21, wherein the metallo-fullerene complexes comprise a metal selected from the group consisting of iron, cobalt, and nickel.

* * * * *